United States Patent
Qin

(10) Patent No.: US 10,992,051 B2
(45) Date of Patent: Apr. 27, 2021

(54) ANTENNA AND ELECTRONIC DEVICE

(71) Applicant: BOE TECHNOLOGY GROUP CO., LTD., Beijing (CN)

(72) Inventor: Guangkui Qin, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/373,973

(22) Filed: Apr. 3, 2019

(65) Prior Publication Data

US 2019/0326682 A1    Oct. 24, 2019

(30) Foreign Application Priority Data

Apr. 18, 2018   (CN) .......................... 201810348966.2

(51) Int. Cl.
  *H01Q 9/04*     (2006.01)
  *H01Q 15/24*    (2006.01)
  *G02B 5/30*     (2006.01)

(52) U.S. Cl.
  CPC ........... *H01Q 15/24* (2013.01); *G02B 5/3008* (2013.01); *G02B 5/3058* (2013.01)

(58) Field of Classification Search
  CPC ........ H01Q 15/24; H01Q 1/1271; H01Q 1/48; H01Q 1/38; H01Q 9/0407; G02B 5/3008; G02B 5/3058
  See application file for complete search history.

(56) References Cited

U.S. PATENT DOCUMENTS

2016/0329363 A1* 11/2016 He ................. G02F 1/136286
2019/0058243 A1    2/2019 Wei

FOREIGN PATENT DOCUMENTS

| CN | 104485334 A | 4/2015 |
| CN | 206236797 A | 6/2017 |
| CN | 10716794 | * 9/2017 |
| CN | 107357077 A | 11/2017 |
| JP | 2009251985 A | 10/2009 |
| JP | 2010009089 A | 1/2010 |
| KR | 101823365 B1 | 3/2018 |

OTHER PUBLICATIONS

Analysis and Design of Highly Transparent Meshed Patch Antenna Backed by a Solid Ground Plane by Yasin et al. (Year: 2017).*
First Chinese Office Action dated Aug. 20, 2019.

* cited by examiner

*Primary Examiner* — Awat M Salih
(74) *Attorney, Agent, or Firm* — Dilworth & Barrese, LLP; Michael J. Musella, Esq.

(57) ABSTRACT

An antenna and an electronic device are provided. The antenna includes a first substrate, a second substrate, a dielectric layer, a ground layer and a radiation layer. The second substrate faces to the first substrate. The dielectric layer is between the first substrate and the second substrate. The ground layer is on a first surface of the first substrate. The radiation layer is on a second surface of the second substrate, and the second surface of the second substrate and the first surface of the first substrate face each other. The ground layer and the radiation layer each include a wire grid polarizer structure.

16 Claims, 4 Drawing Sheets

ANTENNA AND ELECTRONIC DEVICE

CROSS REFERENCE TO RELATED APPLICATION

The present application claims priority of Chinese Patent Application No. 201810348966.2 filed on Apr. 18, 2018, the disclosure of which is incorporated herein by reference in its entirety as part of the present application.

TECHNICAL FIELD

Embodiments of the present disclosure relate to an antenna and an electronic device.

BACKGROUND

With development of wireless communication technologies, mobile communication products have also developed rapidly. Mobile communication products can implement a data transmission function and achieve a purpose of resource sharing. An antenna is one of essential components in the mobile communication products. The antenna is a convertor, which can convert a guided wave propagating on a transmission line into an electromagnetic wave propagating in an unbounded medium (usually free space), or vice versa. The antenna can implement a function of transmitting or receiving an electromagnetic wave, and is widely applied in communication, radar, navigation, broadcasting, television, remote sensing, radio astronomy and many other fields.

SUMMARY

At least one embodiment of the present disclosure provides an antenna, which comprises: a first substrate, a second substrate facing to the first substrate, a dielectric layer between the first substrate and the second substrate, a ground layer on a first surface of the first substrate, and a radiation layer on a second surface of the second substrate. The second surface of the second substrate and the first surface of the first substrate face each other. The ground layer and the radiation layer each comprise a wire grid polarizer structure.

For example, in the antenna provided by an embodiment of the present disclosure, the ground layer comprises a grounding portion having the wire grid polarizer structure, and the radiation layer comprises a radiating portion having the wire grid polarizer structure; and the radiating portion overlaps with the grounding portion in a direction perpendicular to the first surface, and a grid strip extension direction of the radiating portion is same as a grid strip extension direction of the grounding portion.

For example, in the antenna provided by an embodiment of the present disclosure, the ground layer comprises a grounding portion having the wire grid polarizer structure, and the radiation layer comprises a radiating portion having the wire grid polarizer structure; and the radiating portion overlaps with the grounding portion in a direction perpendicular to the first surface, and a grid strip extension direction of the radiating portion and a grid strip extension direction of the grounding portion have an included angle.

For example, the antenna provided by the present disclosure further comprises a transmission line and a feed point; the transmission line is on the first surface of the first substrate and is insulated from the grounding portion; and the feed point is on the first surface of the first substrate, electrically connected to the transmission line, and overlaps with the radiating portion in the direction perpendicular to the first surface.

For example, in the antenna provided by an embodiment of the present disclosure, the radiation layer comprises a plurality of radiating portions, the plurality of radiating portions each comprise the wire grid polarizer structure, the plurality of radiating portions are arranged in an array, grid strip extension directions of two adjacent radiating portions in a row direction are perpendicular to each other, and grid strip extension directions of two adjacent radiating portions in a column direction are perpendicular to each other.

For example, in the antenna provided by an embodiment of the present disclosure, the ground layer comprises a plurality of grounding portions, the plurality of grounding portions each comprise the wire grid polarizer structure, the plurality of radiating portions are in one-to-one correspondence with the plurality of grounding portions, each radiating portion in the plurality of radiating portions overlaps with a corresponding grounding portion in a direction perpendicular to the first surface, and a grid strip extension direction of each radiating portion in the plurality of radiating portions is same as a grid strip extension direction of the corresponding grounding portion.

For example, in the antenna provided by an embodiment of the present disclosure, the ground layer comprises a plurality of grounding portions, the plurality of grounding portions each comprise the wire grid polarizer structure, the plurality of radiating portions are in one-to-one correspondence with the plurality of grounding portions, and each radiating portion in the plurality of radiating portions overlaps with a corresponding grounding portion in a direction perpendicular to the first surface, and a grid strip extension direction of each radiating portion in the plurality of radiating portions and a grid strip extension direction of the corresponding grounding portion have an included angle.

For example, the antenna provided by an embodiment of the present disclosure further comprises a transmission line group and a plurality of feed points; the transmission line group comprises a plurality of branch lines, and the plurality of branch lines are in one-to-one correspondence with the plurality of feed points; the plurality of feed points are on the first surface of the first substrate, and are respectively electrically connected to corresponding branch lines of the transmission line group; the transmission line group is on the first surface of the first substrate, and is insulated from the grounding portions; and the plurality of feed points are in one-to-one correspondence with the plurality of radiating portions, and each of the plurality of feed points overlaps with a corresponding radiating portion in the direction perpendicular to the first surface.

For example, in the antenna provided by an embodiment of the present disclosure, the transmission line group comprises a signal access point, and all distances from the signal access point to respective feed points along the corresponding branch lines of the transmission line group are same.

For example, in the antenna provided by an embodiment of the present disclosure, the wire grid polarizer structure has a grating period of 10 nm to 1000 nm.

For example, in the antenna provided by an embodiment of the present disclosure, the wire grid polarizer structure has a grid strip width of 9 nm to 999 nm.

For example, in the antenna provided by an embodiment of the present disclosure, the ground layer comprises a grounding portion having the wire grid polarizer structure, the grounding portion comprises a first connecting strip, and the first connecting strip extends in a direction perpendicular to a grid strip extension direction of the wire grid polarizer structure of the grounding portion, and is electrically connected to grid strips of the wire grid polarizer structure of the grounding portion.

For example, in the antenna provided by an embodiment of the present disclosure, the first connecting strip is in at least one of the group consisting of a peripheral region and a central region of the grounding portion.

For example, in the antenna provided by an embodiment of the present disclosure, the radiation layer comprises a radiating portion having the wire grid polarizer structure, the radiating portion comprises a second connecting strip, and the second connecting strip extends in a direction perpendicular to a grid strip extension direction of the wire grid polarizer structure of the radiating portion, and is electrically connected to grid strips of the wire grid polarizer structure of the radiating portion.

For example, in the antenna provided by an embodiment of the present disclosure, the second connecting strip is in at least one of the group consisting of a peripheral region and a central region of the radiating portion.

For example, in the antenna provided by an embodiment of the present disclosure, materials of the first substrate and the second substrate are transparent materials.

For example, in the antenna provided by an embodiment of the present disclosure, the radiation layer comprises a radiating portion having the wire grid polarizer structure, a shape of the radiating portion is a square, and a side length of the square is half a wavelength of an electromagnetic wave transmitted by the antenna.

At least one embodiment of the present disclosure further provides an electronic device, comprising the antenna provided by any one of the embodiments of the present disclosure.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure.

DETAILED DESCRIPTION

Figure 1:
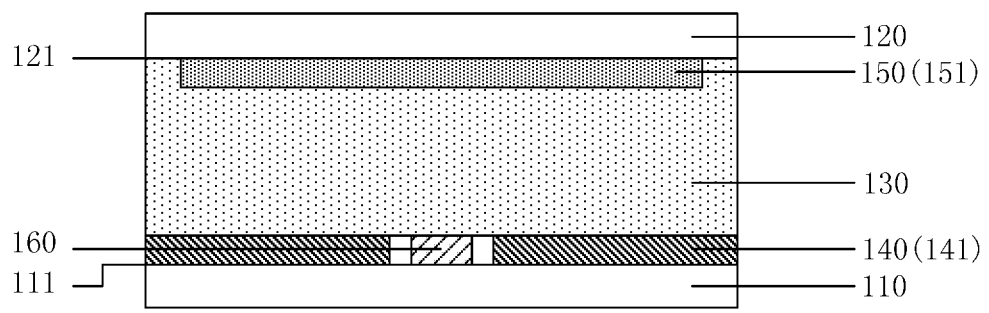
FIG. 1 is a cross-sectional schematic diagram of an antenna provided by at least an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A microstrip antenna is a new type of antenna that has been developed in recent years, which has advantages such as small size, light weight, simple fabrication process and the like. With development of microwave integration technologies and various low-loss dielectric material technologies, the microstrip antenna has been widely used in satellite communication, radar, remote sensing, environmental testing, portable wireless devices and many other fields. The microstrip antenna is an antenna in which a thin dielectric layer has one side attached thereon with a metal layer as a ground plate, and the other side fabricated into a metal patch of a certain shape by using a method, for example, photoresist etching, and then the metal patch is fed by using a microstrip line or a coaxial probe. Since the ground plate and the metal patch cannot transmit light, an application scenario of the microstrip antenna is apt to be restricted, and for example, it cannot combine with window glass, and an electromagnetic wave signal is easily shielded by a wall, which affects a performance of the antenna.

At least some embodiments of the present disclosure provide an antenna and an electronic device, which utilize a wire grid polarizer structure, so that the antenna has light-admitting quality and combines with a transparent material (for example, glass) conveniently, which may save design space, reduce shield of a signal, and help improve working performances.

Hereinafter, the embodiments of the present disclosure will be described in detail with reference to the accompanying drawings. It should be noted that, same reference signs in different drawings are used for denoting same elements that have been described.

At least some embodiments of the present disclosure provide an antenna, which comprises a first substrate, a second substrate, a dielectric layer, a ground layer and a radiation layer. The second substrate faces to the first substrate. The dielectric layer is between the first substrate and the second substrate. The ground layer is on a first surface of the first substrate. The radiation layer is on a second surface of the second substrate, and the second surface of the second substrate and the first surface of the first substrate face each other. The ground layer and the radiation layer each include a wire grid polarizer structure. For example, the wire grid polarizer structure of the ground layer and the wire grid polarizer structure of the radiation layer may be the same or different, and for example, the wire grid polarizer structure of the ground layer and the wire grid polarizer structure of the radiation layer may be different in a feature size and/or a grid strip extension direction.

Figure 2A:
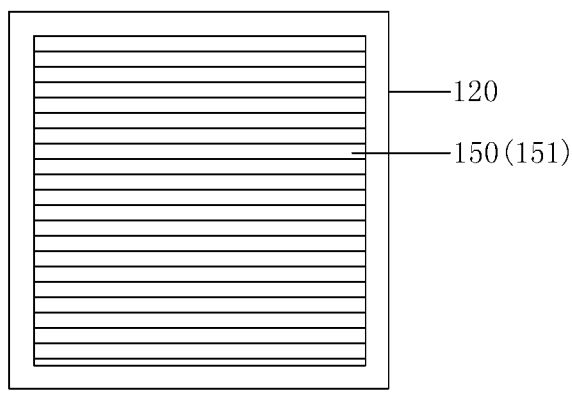
FIG. 2A is a plan schematic diagram of a second substrate of the antenna illustrated in FIG. 1.
Figure 2B:
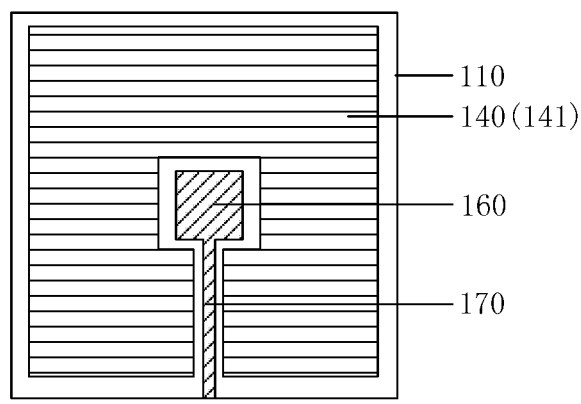
FIG. 2B is a plan schematic diagram of a first substrate of the antenna illustrated in FIG. 1.

FIG. 1 is a cross-sectional schematic diagram of an antenna provided by some embodiments of the present disclosure, FIG. 2A is a plan schematic diagram of a second substrate of the antenna illustrated in FIG. 1, and FIG. 2B is a plan schematic diagram of a first substrate of the antenna illustrated in FIG. 1. With reference to FIG. 1, FIG. 2A and FIG. 2B, the antenna comprises a first substrate 110, a second substrate 120, a dielectric layer 130, a ground layer 140, a radiation layer 150, a feed point 160 and a transmission line 170.

The first substrate 110 faces to the second substrate 120, and the first substrate 110 and the second substrate 120 play roles in supporting, protection, insulation, etc., and may further be used for avoiding electromagnetic wave leakage to reduce antenna loss. For example, materials of the first substrate 110 and the second substrate 120 are transparent materials, for example, glass, a cycloolefin polymer, and the like, to enhance light-admitting quality. The first substrate 110 includes a first surface 111, the second substrate 120 includes a second surface 121, and the first surface 111 and the second surface 121 face each other. It should be noted that, in the embodiments of the present disclosure, the expression "face each other" refers to "be parallel to each other", that is, the first surface 111 and the second surface 121 are parallel to each other. For example, in some examples, as illustrated in FIG. 1, the first surface 111 and the second surface 121 are provided facing to each other, that is, the first surface 111 is on a side of the first substrate 110 close to the second substrate 120, and the second surface 121 is on a side of the second substrate 120 close to the first substrate 110. For another example, in other examples, the first surface 111 and the second surface 121 may also be provided facing away from each other, that is, the first surface 111 is on a side of the first substrate 110 away from the second substrate 120, and the second surface 121 is on a side of the second substrate 120 away from the first substrate 110.

The dielectric layer 130 is between the first substrate 110 and the second substrate 120. For example, the dielectric layer 130 is made of a low-loss dielectric material, for example, a dielectric ceramic, a high molecular polymer, and the like. Of course, the embodiments of the present disclosure are not limited thereto, and the dielectric layer 130 may further be made of a material with an adjustable dielectric constant, for example, a liquid crystal, ferrite, and the like, of which the dielectric constant is adjusted by applying an electric field. For example, in some examples, in a case where the dielectric layer 130 is made of a liquid crystal, the antenna may further comprise a spacer and a sealant. The spacer may be provided between the first substrate 110 and the second substrate 120, and distributed in the dielectric layer 130, to play roles in supporting a structure of a liquid crystal box, enhancing a box thickness, and the like. The sealant may be provided along edges of the first substrate 110 and the second substrate 120, to prevent liquid crystal leakage.

The ground layer 140 is on the first surface 111 of the first substrate 110. The ground layer 140 includes at least one grounding portion 141. The grounding portion 141 is connected to a signal ground (for example, a direct-current low level signal, which, for example, is denoted by VSS), to serve as a ground plate of the antenna. The grounding portion 141 has a wire grid polarizer structure, which can implement a half-transmission-half-reflection mode of light, that is, one portion of light may be transmitted, and the other portion of light may be reflected, so that the antenna has light-admitting quality. It should be noted that, an intensity of light transmitted and an intensity of light reflected may be the same or different, and thus, the light transmittance of the antenna may be set according to needs. The number of grounding portions 141 is not limited (for example, there may be one or more grounding portions 141), and may be determined according to actual needs. It should be noted that, in the respective embodiments of the present disclosure, the ground layer 140 may be of a wire grid polarizer structure, and may also be of a structure in which a wire grid polarizer structure and a metal layer are combined. The grounding portion 141 may be of a wire grid polarizer structure, and may also be of a structure in which a wire grid polarizer structure and a metal layer are combined. In this way, a light transmission position and a light transmittance may be flexibly set to meet requirements of various application scenarios.

For example, in a case where there are a plurality of grounding portions 141, the respective grounding portions 141 are all connected to the signal ground. For example, in some examples, the respective grounding portions 141 are respectively connected to the signal ground through a plurality of electrical conductors on the first surface 111 of the first substrate 110. For example, in other examples, in a case where there are a plurality of grounding portions 141, the respective grounding portions 141 are connected with each other through electrical conductors, and one or more of the grounding portions 141 are connected to the signal ground, such that all the grounding portions 141 are connected to the signal ground. It should be noted that, in the respective embodiments of the present disclosure, a connection mode of the grounding portion 141 and the signal ground is not limited, and may be determined according to actual needs and fabrication processes.

The radiation layer 150 is on the second surface 121 of the second substrate 120. The radiation layer 150 includes at least one radiating portion 151. The radiating portion 151 is used for converting a microwave signal into an electromagnetic wave and allowing the electromagnetic wave to propagate in the free space, to implement an emission function of the antenna. Of course, the radiating portion 151 may further receive an electromagnetic wave propagating in the free space and convert the electromagnetic wave into a microwave signal, to implement a receiving function of the antenna. The radiating portion 151 has a wire grid polarizer structure, and can implement a half-transmission-half-reflection mode of light, that is, one portion of light may be transmitted, and the other portion of light may be reflected, so that the antenna has light-admitting quality. For example, the wire grid polarizer structure of the radiating portion 151 and the wire grid polarizer structure of the grounding portion 141 may cooperate with each other with respect to direction, so that the light transmittance of the antenna may be set according to needs, to meet diverse application requirements. It should be noted that, in the respective embodiments of the present disclosure, the radiation layer 150 may be of a wire grid polarizer structure, and may also be of a structure in which a wire grid polarizer structure and a metal layer are combined. The radiating portion 151 may be of a wire grid polarizer structure, and may also be of a structure in which a wire grid polarizer structure and a metal layer are combined. In this way, a light transmission position and a light transmittance may be flexibly set to meet requirements of various application scenarios.

The number of radiating portions 151 is not limited (for example, there may be one or more radiating portions 151), and may be determined according to actual needs. For example, in a case where there is one radiating portion 151, the antenna may work independently as a single antenna, and may also serve as an antenna unit in an antenna array. In a case where there are a plurality of radiating portions 151, the antenna may be an antenna array, to enhance directivity and improve a gain factor. A shape of the radiating portion 151 is not limited and may be any shape such as a square, a rectangle, a circle and the like. For example, in some examples, the shape of the radiating portion 151 is a square, and a side length of the square is half the wavelength of the electromagnetic wave transmitted by the antenna, to meet requirements of a working frequency band of the antenna. A size of the radiating portion 151 is not limited and may be determined according to actual needs. For example, the respective radiating portions 151 and corresponding grounding portions 141 overlap with each other in a direction perpendicular to the first surface 111, and an area of the grounding portion 141 is larger than or equal to an area of the radiating portion 151.

The feed point 160 is on the first surface 111 of the first substrate 110, and is used for transmitting the microwave signal to a corresponding radiating portion 151 in a manner of induction. The feed point 160 is electrically connected to the transmission line 170. The feed point 160 is insulated from the grounding portion 141. For example, in some examples, an isolation groove or an insulating wall may be provided on the periphery of the feed point 160, to insulate the feed point 160 from the grounding portion 141. For example, the feed point 160 overlaps with the corresponding radiating portion 151 in the direction perpendicular to the first surface 111, to facilitate inductive transmission of the microwave signal to the corresponding radiating portion 151. Here, the radiating portion 151 corresponding to the feed point 160 refers to the radiating portion 151 that overlaps with the feed point 160.

The number of the feed points 160 is not limited, and may be determined according to actual needs, for example, determined according to the number of the radiating portions 151. For example, the number of the feed points 160 is equal to the number of the radiating portions 151. In a case where there is one radiating portion 151, there is also one feed point 160. In a case where there are a plurality of radiating portions 151, there are also a plurality of feed points 160, and the plurality of feed points 160 are in one-to-one correspondence with the plurality of radiating portions 151. A shape of the feed point 160 may be any shape such as a square, a rectangle, a circle and the like, which is not limited in the embodiments of the present disclosure. A size of the feed point 160 is not limited, and may be determined according to actual needs.

The transmission line 170 is on the first surface 111 of the first substrate 110, and is used for transmitting a microwave signal from other separately provided device to the feed point 160; and the device is, for example, a modem, a microwave signal generator, and the like, which is not limited in the embodiments of the present disclosure. For example, the transmission line 170 is in a same layer as the feed point 160. The transmission line 170 is insulated from the grounding portion 141. For example, in some examples, isolation grooves or insulating walls may be provided on both sides of the transmission line 170, to insulate the transmission line 170 from the grounding portion 141. A length and a manner of routing of the transmission line 170 are not limited, and may be determined according to actual needs, for example, determined according to a phase requirement of the microwave signal.

The number of transmission lines 170 is not limited. For example, in some examples, in a case where the radiation layer 150 includes one radiating portion 151, there is one transmission line 170. For example, in other examples, in a case where the radiation layer 150 includes a plurality of radiating portions 151, there are a plurality of transmission lines 170 (for example, the plurality of transmission lines 170 constitute a transmission line group), to respectively transmit the microwave signal to the feed points 160 corresponding to the respective radiating portions 151. For example, the transmission line 170 may be made of copper, aluminum, gold, silver or an alloy thereof, and may also be made of other applicable conductive materials.

In the antenna, the ground layer 140 and the radiation layer 150 each include a wire grid polarizer structure, which may implement a half-transmission-half-reflection mode of light, so that the antenna has light-admitting quality and can combine with a transparent material (for example, glass) conveniently, which may save design space, reduce shield of a signal, and help improve working performances.

Figure 3:
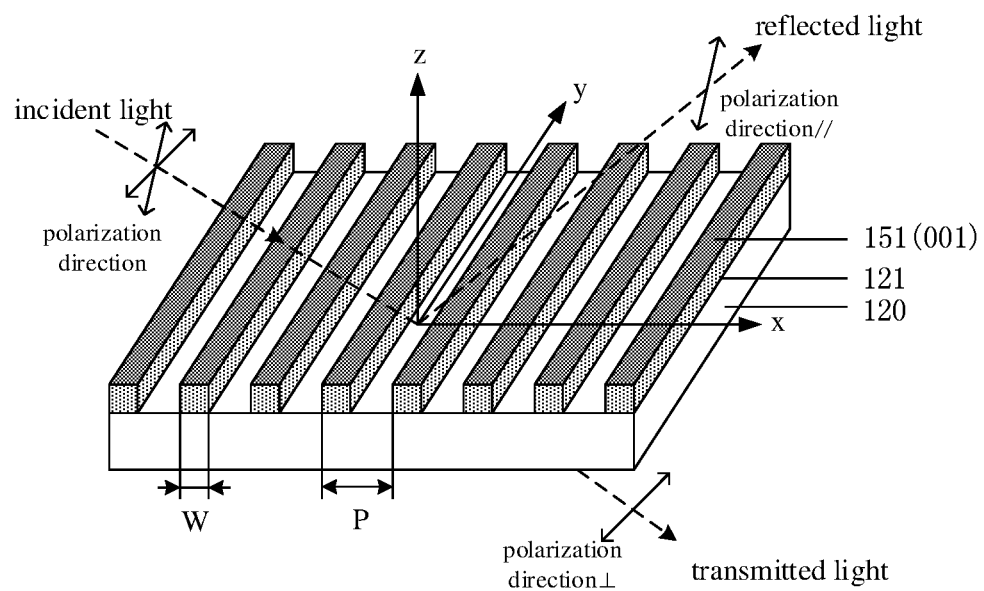
FIG. 3 is a schematic diagram of a wire grid polarizer structure of an antenna provided by at least an embodiment of the present disclosure.

FIG. 3 is a schematic diagram of a wire grid polarizer structure of an antenna provided by some embodiments of the present disclosure. With reference to FIG. 3, the radiating portion 151 is of a wire grid polarizer structure, and includes a plurality of grid strips 001. The plurality of grid strips 001 are on the second surface 121 of the second substrate 120. For example, the plurality of grid strips 001 maintain a uniform distance and are arranged in parallel. For example, a grating period (i.e., a grating constant) P of the wire grid polarizer structure is from 10 nm to 1000 nm. For example, in order that the wire grid polarizer structure has a better polarization characteristic and light-admitting quality, the grating period P may be in a visible light wavelength range, that is, from 380 nm to 780 nm. For example, a width W of the grid strip 001 of the wire grid polarizer structure is from 9 nm to 999 nm. For example, the wire grid polarizer structure may be made of copper, aluminum, gold, silver or an alloy thereof, and may also be made of other applicable conductive materials. A cross-sectional shape of the grid strip 001 may be a rectangle, a trapezoid, or other applicable shape.

Because a feature size (for example, the grating period or the grating constant) of the wire grid polarizer structure is in a sub-wavelength range, that is, the feature size of the wire grid polarizer structure is slightly smaller than or slightly larger than a wavelength of incident light of the antenna, or is substantially equal to the wavelength thereof, the wire grid polarizer structure exhibits properties different from those of a general wire grid (for example, a diffraction grating) in aspects such as reflectance, transmittance, polarization characteristic and the like.

When incident light irradiates onto the wire grid polarizer structure, an electromagnetic vector of the incident light may be decomposed into polarized light in an incident plane and polarized light perpendicular to the incident plane that are independent of each other, that is, polarized light in an xz plane and polarized light parallel to a y direction. A polarization direction of the polarized light in the xz plane is perpendicular to a grid strip extension direction, and a polarization direction of the polarized light parallel to the y direction is parallel to the grid strip extension direction. Here, the grid strip extension direction refers to an extending direction of the grid strip 001, that is, the y direction. Because the polarized light perpendicular to the grid strip extension direction and the polarized light parallel to the grid strip extension direction are different in a boundary condition, they are also different in an equivalent refractive index. The polarized light parallel to the grid strip extension direction excites electron oscillation of a surface of the grid strip 001 to generate a current, so that the polarized light in this direction is reflected. The polarized light perpendicular to the grid strip extension direction cannot induce a current due to presence of an air gap, so that the polarized light in this direction is transmitted out. Therefore, the wire grid polarizer structure implements a half-transmission-half-reflection mode of incident light, and thus, has light-admitting quality.

It should be noted that, in the respective embodiments of the present disclosure, the wire grid polarizer structure of the grounding portion 141 is similar to the wire grid polarizer structure of the radiating portion 151 as described above, which is not repeated here. For example, a grid strip extension direction of the radiating portion 151 is the same or substantially the same as a grid strip extension direction of a corresponding grounding portion 141 (the radiating portion 151 overlaps with the corresponding grounding portion 141 in the direction perpendicular to the first surface 111). In this way, the polarization direction of polarized light that can be transmitted by the radiating portion 151 is the same as the polarization direction of polarized light that can be transmitted by the corresponding grounding portion 141, so that the antenna has better light-admitting quality. Of course, the embodiments of the present disclosure are not limited thereto, and the grid strip extension direction of the radiating portion 151 and the grid strip extension direction of the corresponding grounding portion 141 may also have a certain angle (i.e., have an included angle), so that the light transmittance of the antenna can be flexibly set according to actual needs. For example, the included angle may be of any degree, which may be determined according to actual needs, and is not limited in the embodiments of the present disclosure.

Figure 4:
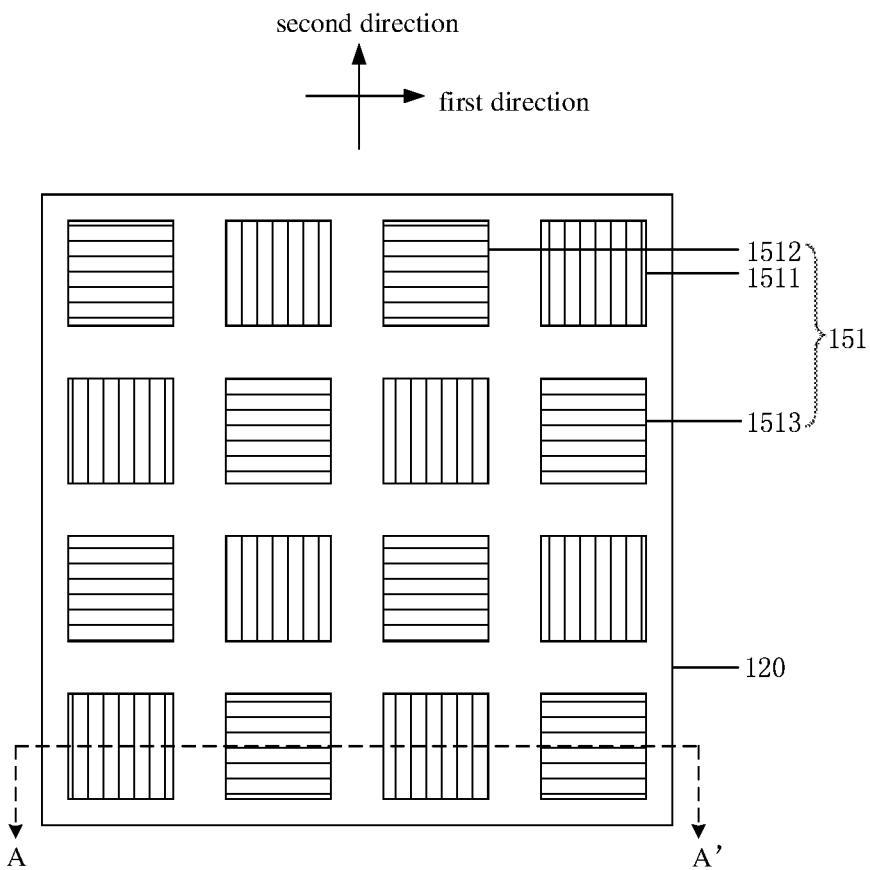
FIG. 4 is a plan schematic diagram of a second substrate of another antenna provided by at least an embodiment of the present disclosure.

FIG. 4 is a plan schematic diagram of a second substrate of another antenna provided by some embodiments of the present disclosure. With reference to FIG. 4, a radiation layer 150 includes a plurality of radiating portions 151. The plurality of radiating portions 151 each include a wire grid polarizer structure. The plurality of radiating portions 151 are arranged in an array and are uniformly provided on a second substrate 120. For example, grid strip extension directions of two adjacent radiating portions 151 in a row direction (a first direction) are perpendicular to each other, and grid strip extension directions of two adjacent radiating portions 151 in a column direction (a second direction) are perpendicular to each other. For example, a first radiating portion 1511 and a second radiating portion 1512 are adjacent to each other in the row direction, a grid strip extension direction of the first radiating portion 1511 is the second direction, and a grid strip extension direction of the second radiating portion 1512 is the first direction. The first radiating portion 1511 and a third radiating portion 1513 are adjacent to each other in the column direction, the grid strip extension direction of the first radiating portion 1511 is the second direction, and a grid strip extension direction of the third radiating portion 1513 is the first direction. For example, the first direction and the second direction are perpendicular to each other. Similarly, an arrangement mode of grid strip extension directions of other adjacent radiating portions 151 is similar to that of the first radiating portion 1511, the second radiating portion 1512 and the third radiating portion 1513 as described above, which is not repeated here.

In this way, two adjacent radiating portions 151 may receive microwave signals whose polarization directions are perpendicular to each other, so that the antenna having an array of the radiating portions 151 may receive a microwave signal of any polarization direction. Moreover, polarization directions of polarized light that can be transmitted by two adjacent radiating portions 151 are perpendicular to each other, such that the antenna can be applicable to incident light of any polarization direction, the light transmittance and the light transmission position are not affected by the polarization direction of the polarized light, and transmitted light is more uniform.

It should be noted that, in the respective embodiments of the present disclosure, the grid strip extension direction of the radiating portion 151 may be any direction, and is not limited to the row direction or the column direction. In addition, the included angle between the grid strip extension directions of adjacent radiating portions 151 may be of any degree, which is not limited to 90 degrees (that is, a case where the grid strip extension directions of the adjacent radiating portions 151 are perpendicular to each other). The grid strip extension directions of the radiating portions 151 and the included angle between them may be determined according to actual needs. For example, in other examples, in order to ensure that the antenna transmits incident light of only a certain polarization direction, grid strip extension directions of the plurality of radiating portions 151 may be the same and all perpendicular to the polarization direction, so that the antenna has the largest light transmittance with respect to the polarized light of this polarization direction.

Figure 5:
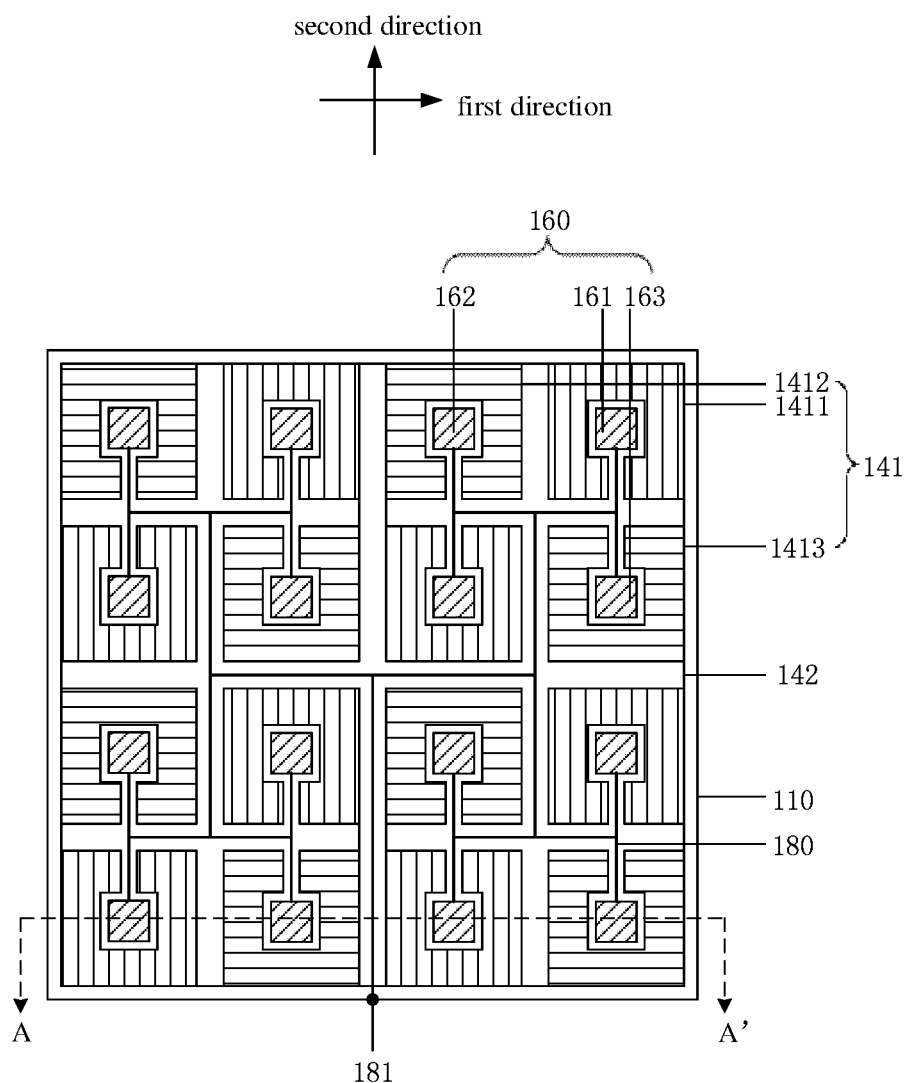
FIG. 5 is a plan schematic diagram of a first substrate of the antenna illustrated in FIG. 4.

FIG. 5 is a plan schematic diagram of a first substrate of the antenna illustrated in FIG. 4. With reference to FIG. 5, a ground layer 140 includes a plurality of grounding portions 141. The plurality of grounding portions 141 each include a wire grid polarizer structure. The plurality of grounding portions 141 are arranged in an array and are uniformly provided on a first substrate 110. The plurality of grounding portions 141 are connected with each other through electrical conductors 142 on the first substrate 110, and are connected to a signal ground. The plurality of radiating portions 151 illustrated in FIG. 4 are in one-to-one correspondence with the plurality of grounding portions 141 illustrated in FIG. 5, that is, the plurality of radiating portions 151 respectively overlap with the plurality of grounding portions 141 in a direction perpendicular to a first surface 111. For example, a grid strip extension direction of each radiating portion 151 in the plurality of radiating portions 151 illustrated in FIG. 4 is the same as a grid strip extension direction of the corresponding grounding portion 141 illustrated in FIG. 5. For example, a first grounding portion 1411 is a grounding portion corresponding to the first radiating portion 1511, that is, the first grounding portion 1411 overlaps with the first radiating portion 1511 in the direction perpendicular to the first surface 111. A grid strip extension direction of the first grounding portion 1411 and the grid strip extension direction of the first radiating portion 1511 are the same, and both are the second direction. Similarly, the grid strip extension direction of the second radiating portion 1512 and a grid strip extension direction of a corresponding second grounding portion 1412 are the same, and both are the first direction. The grid strip extension direction of the third radiating portion 1513 and a grid strip extension direction of a corresponding third grounding portion 1413 are the same, and both are the first direction. An arrangement mode of grid strip extension directions of other grounding portions 141 is similar thereto. In this way, the antenna may be ensured to have good light-admitting quality. It should be noted that, in some embodiments of the present disclosure, the grid strip extension direction of each radiating portion 151 in the plurality of radiating portions 151 and the grid strip extension direction of the corresponding grounding portion 141 may also have an included angle, and the included angle may be of any degree, which may be determined according to actual needs.

As illustrated in FIG. 5, the antenna further comprises a transmission line group 180. The transmission line group 180 is on the first surface 111 of the first substrate 110 and is insulated from the grounding portions 141. For example, the transmission line group 180 includes a plurality of transmission lines, and associated features of the transmission lines are similar to those of the transmission line 170 as described in FIG. 2B, which is not repeated here. For example, each transmission line in the plurality of transmission lines in the transmission line group 180 is called a branch line of the transmission line group 180. The transmission line group 180 further includes a signal access point 181. The signal access point 181 is used for receiving a microwave signal from other device, to transmit the microwave signal to ends of the respective branch lines. Of course, the embodiments of the present disclosure are not limited thereto, and the signal access point 181 may further transmit microwave signals from the respective branch lines to other device. An arrangement position of the signal access point 181 is not limited and may be determined according to actual needs. It should be noted that, the signal access point 181 does not represent a component that actually exists, but represents a convergence point of relevant electrical connections.

Figure 6:
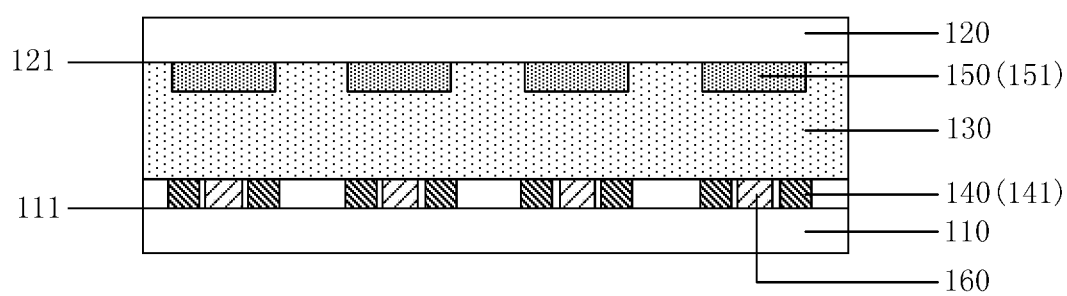
FIG. 6 is a cross-sectional schematic diagram of the antenna illustrated in FIG. 4 and FIG. 5 along an A-A' direction in FIG. 4 and FIG. 5.

As illustrated in FIG. 5, the antenna further comprises a plurality of feed points 160. The plurality of feed points 160 are on the first surface 111 of the first substrate 110 and are respectively electrically connected to corresponding branch lines of the transmission line group 180, to receive microwave signals transmitted from the signal access point 181 to the ends of the respective branch lines, or transmit induced microwave signals to the signal access point 181 through corresponding branch lines. For example, the plurality of feed points 160 are in a same layer as the transmission line group 180. For example, the plurality of branch lines of the transmission line group 180 are (for example, connected) in one-to-one correspondence with the plurality of feed points 160. FIG. 6 is a cross-sectional schematic diagram of the antenna illustrated in FIG. 4 and FIG. 5 along an A-A' direction in FIG. 4 and FIG. 5. As illustrated in FIG. 4, FIG. 5 and FIG. 6, the plurality of feed points 160 are in one-to-one correspondence with the plurality of radiating portions 151, that is, the plurality of feed points 160 respectively overlap with the plurality of radiating portions 151 in the direction perpendicular to the first surface 111 one by one. For example, a first feed point 161 corresponds to the first radiating portion 1511, and the two overlap with each other. A second feed point 162 corresponds to the second radiating portion 1512, and the two overlap with each other. A third feed point 163 corresponds to the third radiating portion 1513, and the two overlap with each other. An arrangement mode of other feed points 160 and other radiating portions 151 is similar thereto.

For example, all distances from the signal access point 181 of the transmission line group 180 to the feed points 160 along corresponding branch lines of the transmission line group 180 are same or substantially same, so that phase positions of microwave signals reaching the respective feed points 160 are ensured to be uniform or substantially uniform, or phase positions of microwave signals transmitted from the respective feed points 160 to the signal access point 181 are ensured to be uniform or substantially uniform. For example, in some examples, a manner of routing of the respective branch lines of the transmission line group 180 is illustrated in FIG. 5. Of course, the embodiments of the present disclosure are not limited thereto, and the manner of routing of the respective branch lines of the transmission line group 180 may also be other applicable manner, as long as it is ensured that distances from the signal access point 181 to the feed points 160 along the corresponding branch lines of the transmission line group 180 are the same or substantially the same.

Figure 7:
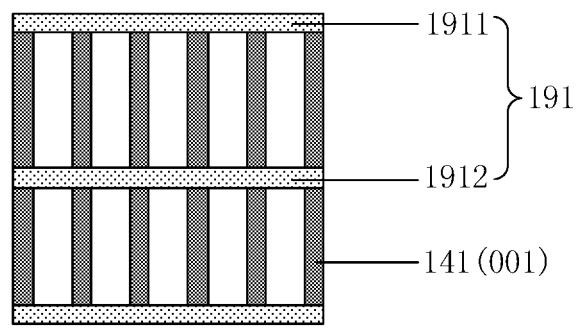
FIG. 7 is a schematic diagram of a grounding portion of an antenna provided by at least an embodiment of the present disclosure.

FIG. 7 is a schematic diagram of a grounding portion of an antenna provided by some embodiments of the present disclosure. With reference to FIG. 7, a grounding portion 141 is of a wire grid polarizer structure, and includes a plurality of grid strips 001 and a first connecting strip 191. The plurality of grid strips 001 are arranged in parallel. The first connecting strip 191 extends in a direction perpendicular to a grid strip extension direction of the wire grid polarizer structure of the grounding portion 141, and is electrically connected to the grid strips 001 of the wire grid polarizer structure of the grounding portion 141. By providing the first connecting strip 191, the grounding portion 141 may have better electrical conductivity. Of course, the embodiments of the present disclosure are not limited thereto, and an included angle between the first connecting strip 191 and the grid strip extension direction may be of any degree, which is not limited to 90 degrees.

For example, the first connecting strip 191 is in at least one of the group consisting of a peripheral region and a central region of the grounding portion 141. For example, in some examples, the first connecting strip 191 includes a peripheral-region first connecting strip 1911 and a central-region first connecting strip 1912, the peripheral-region first connecting strip 1911 is in the peripheral region of the grounding portion 141, and the central-region first connecting strip 1912 is in the central region of the grounding portion 141, so as to attenuate influence on uniformity of transmitted light while improving electrical conductivity. It should be noted that, in the respective embodiments of the present disclosure, the number of the first connecting strips 191 and the arrangement positions thereof are not limited, and may be determined according to actual needs.

Figure 8:
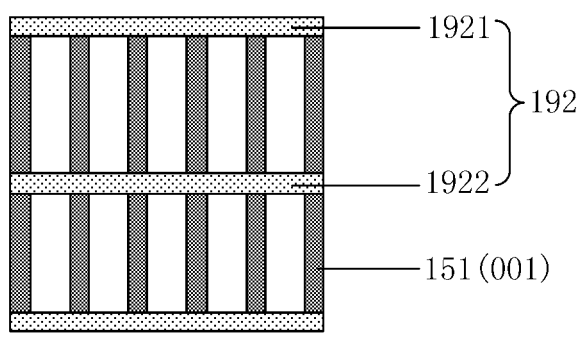
FIG. 8 is a schematic diagram of a radiating portion of an antenna provided by at least an embodiment of the present disclosure.

FIG. 8 is a schematic diagram of a radiating portion of an antenna provided by some embodiments of the present disclosure. With reference to FIG. 8, a radiating portion 151 is of a wire grid polarizer structure, and includes a plurality of grid strips 001 and a second connecting strip 192. The plurality of grid strips 001 are arranged in parallel. The second connecting strip 192 extends in a direction perpendicular to a grid strip extension direction of the wire grid polarizer structure of the radiating portion 151, and is electrically connected to the grid strips 001 of the wire grid polarizer structure of the radiating portion 151. By providing the second connecting strip 192, the radiating portion 151 may have better electrical conductivity. Of course, the embodiments of the present disclosure are not limited thereto, and an included angle between the second connecting strip 192 and the grid strip extension direction may be of any degree, which is not limited to 90 degrees.

For example, the second connecting strip 192 is in at least one of the group consisting of a peripheral region and a central region of the radiating portion 151. For example, in some examples, the second connecting strip 192 includes a peripheral-region second connecting strip 1921 and a central-region second connecting strip 1922, the peripheral-region second connecting strip 1921 is in the peripheral region of the radiating portion 151, and the central-region second connecting strip 1922 is in the central region of the radiating portion 151, so as to attenuate influence on uniformity of transmitted light while improving electrical conductivity. It should be noted that, in the respective embodiments of the present disclosure, the number of the second connecting strips 192 and the arrangement positions thereof are not limited, and may be determined according to actual needs.

At least one embodiment of the present disclosure further provides an electronic device, which comprises the antenna according to any one embodiment of the present disclosure. The antenna in the electronic device has light-admitting quality and can combine with a transparent material (for example, glass) conveniently, which may save design space, reduce shield of a signal, and help improve working performances.

Figure 9:
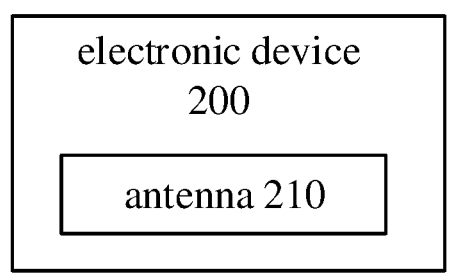
FIG. 9 is a schematic block diagram of an electronic device provided by at least an embodiment of the present disclosure.

FIG. 9 is a schematic block diagram of an electronic device provided by some embodiments of the present disclosure. With reference to FIG. 9, an electronic device 200 comprises an antenna 210. The antenna 210 is the antenna provided by any one embodiment of the present disclosure. The electronic device 200 may be a mobile phone, a radar, a communication base station instrument, and any other device including an antenna, which is not limited in the embodiments of the present disclosure. The electronic device 200 may further comprise more components, and connection relationships between the respective components and the antenna 210 are not limited.

The following is to be noted:

(1) The drawings of the present disclosure only relate to the structures relevant to the embodiments of the present disclosure, and other structures may be referred to the common design;

(2) In the case of no conflict, the embodiments of the present disclosure and the features of the embodiments may be combined with each other to obtain new embodiments.

What have been described above are only specific implementations of the present disclosure, the protection scope of the present disclosure is not limited thereto, and the protection scope of the present disclosure should be based on the protection scope of the claims.

What is claimed is:

1. An antenna, comprising:
a first substrate;
a second substrate facing to the first substrate;
a dielectric layer between the first substrate and the second substrate;
a ground layer on a first surface of the first substrate; and
a radiation layer on a second surface of the second substrate, the second surface of the second substrate and the first surface of the first substrate facing each other,
wherein the ground layer and the radiation layer each comprise a wire grid polarizer structure;
the radiation layer comprises a plurality of radiating portions,
the plurality of radiating portions each comprise the wire grid polarizer structure, the plurality of radiating portions are arranged in an array, grid strip extension directions of two adjacent radiating portions in a row direction are perpendicular to each other, and grid strip extension directions of two adjacent radiating portions in a column direction are perpendicular to each other; and
the ground layer comprises a plurality of grounding portions, the plurality of grounding portions each comprise the wire grid polarizer structure,
the plurality of radiating portions are in one-to-one correspondence with the plurality of grounding portions,
each radiating portion in the plurality of radiating portions overlaps with a corresponding grounding portion in a direction perpendicular to the first surface, and
a grid strip extension direction of each radiating portion in the plurality of radiating portions is same as a grid strip extension direction of the corresponding grounding portion.

2. The antenna according to claim 1, wherein the ground layer comprises a grounding portion having the wire grid polarizer structure, and the radiation layer comprises a radiating portion having the wire grid polarizer structure; and
the radiating portion overlaps with the grounding portion in a direction perpendicular to the first surface, and a grid strip extension direction of the radiating portion is same as a grid strip extension direction of the grounding portion.

3. The antenna according to claim 2, further comprising a transmission line and a feed point,
wherein the transmission line is on the first surface of the first substrate and is insulated from the grounding portion; and
the feed point is on the first surface of the first substrate, electrically connected to the transmission line, and overlaps with the radiating portion in the direction perpendicular to the first surface.

4. The antenna according to claim 1, wherein the ground layer comprises a grounding portion having the wire grid polarizer structure, and the radiation layer comprises a radiating portion having the wire grid polarizer structure; and
the radiating portion overlaps with the grounding portion in a direction perpendicular to the first surface, and a grid strip extension direction of the radiating portion and a grid strip extension direction of the grounding portion have an included angle.

5. The antenna according to claim 4, further comprising a transmission line and a feed point,
wherein the transmission line is on the first surface of the first substrate and is insulated from the grounding portion; and
the feed point is on the first surface of the first substrate, electrically connected to the transmission line, and overlaps with the radiating portion in the direction perpendicular to the first surface.

6. The antenna according to claim 1, further comprising a transmission line group and a plurality of feed points,
- wherein the transmission line group comprises a plurality of branch lines, and the plurality of branch lines are in one-to-one correspondence with the plurality of feed points;
- the plurality of feed points are on the first surface of the first substrate, and are respectively electrically connected to corresponding branch lines of the transmission line group;
- the transmission line group is on the first surface of the first substrate, and is insulated from the grounding portions; and
- the plurality of feed points are in one-to-one correspondence with the plurality of radiating portions, and each of the plurality of feed points overlaps with a corresponding radiating portion in the direction perpendicular to the first surface.

7. The antenna according to claim 6, wherein the transmission line group comprises a signal access point, and
- all distances from the signal access point to respective feed points along the corresponding branch lines of the transmission line group are same.

8. The antenna according to claim 1, wherein the wire grid polarizer structure has a grating period of 10 nm to 1000 nm.

9. The antenna according to claim 1, wherein the wire grid polarizer structure has a grid strip width of 9 nm to 999 nm.

10. The antenna according to claim 1, wherein the ground layer comprises a grounding portion having the wire grid polarizer structure, the grounding portion comprises a first connecting strip, and
- the first connecting strip extends in a direction perpendicular to a grid strip extension direction of the wire grid polarizer structure of the grounding portion, and is electrically connected to grid strips of the wire grid polarizer structure of the grounding portion.

11. The antenna according to claim 10, wherein the first connecting strip is in at least one of the group consisting of a peripheral region and a central region of the grounding portion.

12. The antenna according to claim 1, wherein the radiation layer comprises a radiating portion having the wire grid polarizer structure, the radiating portion comprises a second connecting strip, and
- the second connecting strip extends in a direction perpendicular to a grid strip extension direction of the wire grid polarizer structure of the radiating portion, and is electrically connected to grid strips of the wire grid polarizer structure of the radiating portion.

13. The antenna according to claim 12, wherein the second connecting strip is in at least one of the group consisting of a peripheral region and a central region of the radiating portion.

14. The antenna according to claim 1, wherein materials of the first substrate and the second substrate are transparent materials.

15. The antenna according to claim 1, wherein the radiation layer comprises a radiating portion having the wire grid polarizer structure, a shape of the radiating portion is a square, and a side length of the square is half a wavelength of an electromagnetic wave transmitted by the antenna.

16. An electronic device, comprising the antenna according to claim 1.

* * * * *